(12) United States Patent
Liu (10) Patent No.: US 11,052,539 B2
(45) Date of Patent: Jul. 6, 2021

(54) METHOD, SERVER AND STORAGE MEDIUM FOR ROBOT ROUTING

(71) Applicant: BEIJING GEEKPLUS TECHNOLOGY CO. LTD., Beijing (CN)

(72) Inventor: Kai Liu, Beijing (CN)

(73) Assignee: BEIJING GEEKPLUS TECHNOLOGY CO. LTD., Beijing (CN)

( * ) Notice: Subject to any disclaimer, the term of this patent is extended or adjusted under 35 U.S.C. 154(b) by 0 days.

(21) Appl. No.: 16/848,574

(22) Filed: Apr. 14, 2020

(65) Prior Publication Data

US 2021/0078175 A1 Mar. 18, 2021

(30) Foreign Application Priority Data

Sep. 12, 2019 (CN) .......................... 201910865968.3

(51) Int. Cl.
*G05B 19/18* (2006.01)
*G05B 19/04* (2006.01)
*B25J 9/16* (2006.01)
*G05D 1/02* (2020.01)

(52) U.S. Cl.
CPC ........... *B25J 9/1666* (2013.01); *B25J 9/1694* (2013.01); *G05D 1/02* (2013.01); *G05D 1/0214* (2013.01); *G05D 1/0217* (2013.01)

(58) Field of Classification Search
CPC ..... B25J 9/1666; B25J 9/1694; G05D 1/0214; G05D 1/0217; G05D 1/0212; G05D 1/02; G05B 2219/39146; G05B 2219/39153; G05B 2219/40434
See application file for complete search history.

(56) References Cited

U.S. PATENT DOCUMENTS

| 10,093,526 B2 | 10/2018 | D'Andrea | |
|---|---|---|---|
| 2007/0290040 A1* | 12/2007 | Wurman | ............... G06Q 10/087 235/385 |
| 2018/0299882 A1* | 10/2018 | Kichkaylo | ........... G05D 1/0289 |

FOREIGN PATENT DOCUMENTS

CN 108945920 A 12/2018

* cited by examiner

*Primary Examiner* — Abby Y Lin
*Assistant Examiner* — Sohana Tanju Khayer
(74) *Attorney, Agent, or Firm* — Christensen, Fonder, Dardi & Herbert PLLC (57) ABSTRACT

Method, server and storage medium for robot routing are provided. An operation area of the robot is gridded into a plurality of cells arranged in rows and columns. The method includes: planning, for the robot, a traveling path from a starting point to a destination point, where the traveling path is divided into a plurality of path segments; and reserving, one or more cells corresponding to a first path segment for the robot, where the first path segment is anyone of at least one among the plurality of path segments, in case that there is the deadlock phenomenon, refraining from reserving the cell for the robot, and re-checking whether the deadlock phenomenon is still present in the cell after a preset interval; and in case that there is no deadlock phenomenon, reserving the cell for the robot.

17 Claims, 9 Drawing Sheets

METHOD, SERVER AND STORAGE MEDIUM FOR ROBOT ROUTING

CROSS-REFERENCE TO RELATED APPLICATIONS

This application claims the priority of Chinese Patent Application 201910865968.3 entitled "Method, device, server and storage medium for robot routing", filed on Sep. 12, 2019 with State Intellectual Property Office of PRC. The aforementioned application is herein incorporated by reference in its entirety.

FIELD OF THE TECHNOLOGY

The present disclosure relates to the field of robots, and in particular, to a method, a server, and a storage medium for robot routing.

BACKGROUND OF THE DISCLOSURE

With the rapid development of automation technology, robots are increasingly appearing. A mobile robot is a device that intelligently controls movements to perform various tasks, such as cleaning robots, smart forklifts, and robots used in intelligent picking systems to transport shelves and other storage containers. In the scenario where multiple robots work together, the routing algorithm directly affects the efficiency of the entire system.

SUMMARY

Illustration is made by taking the robot for transporting shelves in the intelligent picking system as an example. The inventors of the present invention found in the research that after choosing a robot according to the picking task, the server will plan a traveling path for the robot according to a preset routing algorithm. The robot will wait for goods picking in the queuing area after transporting the shelf along the traveling path to the worksite. All robots waiting in the queuing area are prone to paralyze and the operator needs to restart the robots repeatedly, eventually causing the overall system to be inefficient.

In view of the above problems, embodiments of the present invention provide a method, a server, and a storage medium for robot routing, which can improve the system efficiency.

In a first aspect, an embodiment of the present invention provides a method for routing a robot, where an operation area of the robot is gridded into a plurality of cells arranged in rows and columns, and the method includes:

planning, for the robot, a traveling path from a starting point to a destination point, wherein the traveling path is divided into a plurality of path segments; and reserving, one or more cells corresponding to a first path segment for the robot, where, the first path segment is anyone of at least one among the plurality of path segments, in a process of reserving one or more cells corresponding to the first path segment for the robot, for any cell to be reserved, checking whether there is a deadlock phenomenon in the cell to be reserved;
  in case that there is the deadlock phenomenon, refraining from reserving the cell for the robot, and re-checking whether the deadlock phenomenon is still present in the cell after a preset interval; and
  in case that there is no deadlock phenomenon, reserving the cell for the robot.

In a second aspect, an embodiment of the present invention provides a server including:
  one or more processing devices; and
  a storing device for storing one or more programs;
  when being executed by the one or more processing devices, the one or more programs enabling the one or more processing devices to perform any of the methods for routing a robot according to the embodiments of the present invention.

In a third aspect, an embodiment of the present invention provides a computer-readable storage medium having a computer program stored thereon, when being executed by a processor, the program implementing any of the methods for routing a robot according to the embodiments of the present invention.

In the technical solution provided by the embodiment of the present invention, in a robot cluster application scenario, a traveling path of a robot is routed at a granularity of cells; in the process of reserving, one or more cells corresponding to anyone of at least one among the plurality of path segments, during the routing process, it is checked whether deadlock phenomenon is present in any cell to be reserved; and if there is no deadlock phenomenon, the cell is reserved for the robot. By checking the deadlock phenomenon, the robot can be prevented from entering the deadlock path and paralyzing in place, resulting in long time waiting, whereby improving the efficiency of the entire system.

BRIEF DESCRIPTION OF THE DRAWINGS

In order to explain the technical solutions of the exemplary embodiments of the present invention more clearly, the drawings used in describing the embodiments are briefly introduced below. Obviously, the introduced drawings are only some of the drawings of embodiments of the present invention, but not all the drawings. Those of ordinary skill in the art may conceive other drawings based on these drawings without any creative work.

DESCRIPTION OF EMBODIMENTS

The present invention will be further described in detail below with reference to the drawings and embodiments. It can be understood that the specific embodiments described herein are only used to explain the present invention, rather than limiting the present invention. It should also be noted that, for the convenience of description, only some parts related to the present invention, rather than all the structures, are shown in the drawings.

Before discussing the exemplary embodiments in more detail, it should be mentioned that some exemplary embodiments are described in processes or methods depicted as flowcharts. Although a flowchart describes operations (or steps) as a sequential process, many of the operations (or steps) can be performed in parallel, concurrently, or simultaneously. In addition, the order of operations can be rearranged. The process may be terminated when its operations are completed, but the process may include additional steps not shown in the drawings. The process may correspond to methods, functions, procedures, subroutines, subprograms, and so on.

Figure 1:
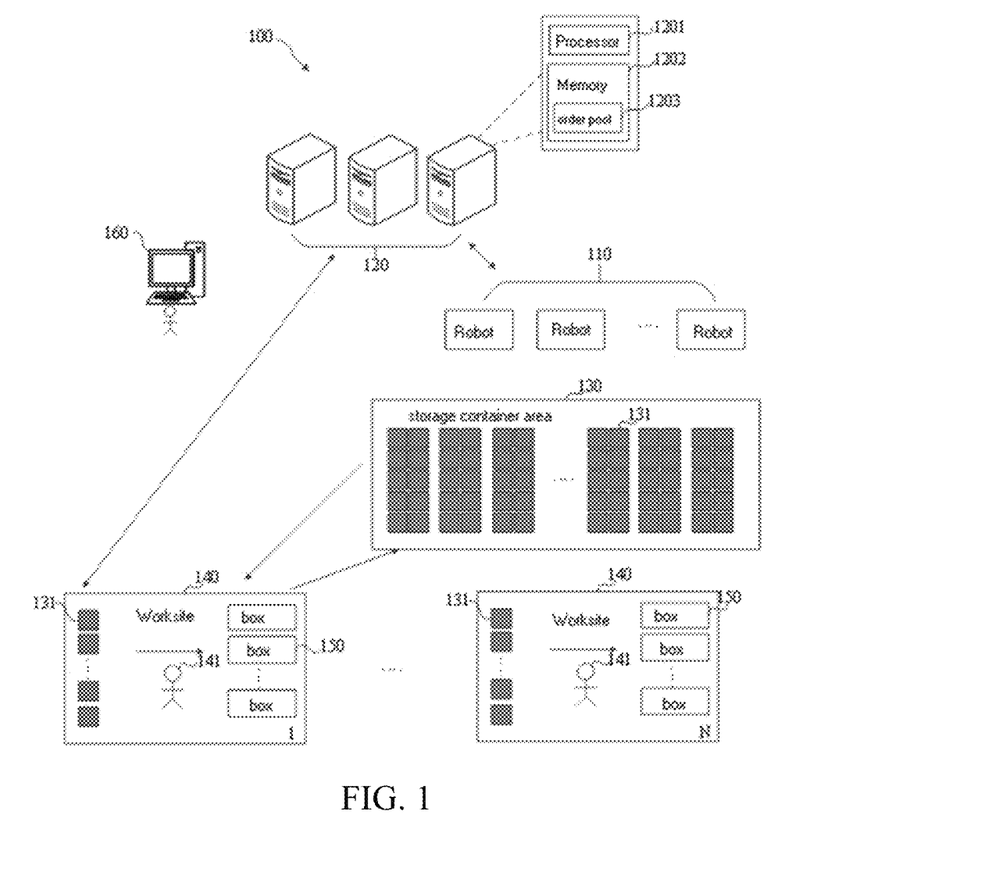
FIG. 1 is a schematic diagram of a system structure of a warehouse picking system provided in an embodiment of the present invention.

In order to understand the technical solution of the embodiment of the present invention better, a scenario of a typical robot cluster application is provided below. Of course, the scenario provided in this embodiment is only an example. FIG. 1 is a schematic diagram of a system structure of a warehouse picking system provided in an embodiment of the present invention. Referring to FIG. 1, the picking system 100 includes robots 110, a control system 120, a storage container area 130, and a worksite 140. The storage container area 130 is provided with multiple storage containers 131, and various items are placed on the storage containers 131, as the shelves with various commodities in a supermarket. The multiple storage containers 131 are arranged in an array. The robot 110 may be a self-driven robot. Generally, a plurality of worksites 140 are arranged on one side of the storage container area 130.

The control system 120 and the robots 110 are in wireless communication; the staff can control the work of the control system 120 via a console 160; and the robots may perform item transportation tasks under the control of the control system 120. For example, a robot 110 can travel along an empty space in the array of the storage containers (a part of the traveling passage of the robot 110), move to a target storage container 131, dock with the target storage container 131, and transport the target storage container 131 to an assigned worksite 140. For example, the robot 110 moves to a place underneath the target storage container 131, lifts the target storage container 131 with a lifting mechanism, and transports the target storage container 131 to the assigned worksite 140.

In one example, a robot 110 is provided with a lifting mechanism, and has an autonomous navigation function. The robot 110 can travel to a place underneath the target storage container 131, and lift the whole target storage container 131 with the lifting mechanism, so that the storage container 131 can be moved up and down along with the lifting mechanism with lifting function. In one example, a robot 110 can capture a two-dimensional code (containing location information) provided on the ground with a camera and travel forward according to the location information in the two-dimensional code, and can travel to the place underneath the storage container 131 indicated by the control system 120 along a path determined by the control system 120.

The robot 110 transports the target storage container 131 to the worksite 140, where the picking staff or picking robots pick items from the storage container 131 to circulation box(es) 150 for packing.

The control system 120 is a software system running on a server and having data storage and information processing capabilities, and can be connected to robots, hardware input systems, and other software systems in a wireless or wired manner. The control system 120 may include one or more servers, which may be in centralized control architecture or distributed computing architecture. The server includes a processor 1201 and a memory 1202, and the memory 1202 may have stored an order pool 1203.

A case, that the storage container area in the picking system shown in FIG. 1 is the operation area of the robots, is taken as an example. In related technology, the robots 110 transport storage containers such as shelves and bins to the worksite along pre-planned traveling paths and then wait in the queuing area for goods picking. Path deadlock is prone to occur to the robots 110 due to various factors when waiting in the queuing area, which will in turn cause all robots in the queuing area failing to work and be paralyzed in place, eventually causing the overall system to be inefficient. Therefore, it is necessary to provide a new routing scheme to perform deadlock checking during the traveling of the robots and perform routing according to the deadlock checking result, so as to improve the efficiency of the system.

The method, device, server, and storage medium for robot routing provided in the embodiments of the present invention are described in detail below in connection with various embodiments.

Embodiment 1

Figure 2:
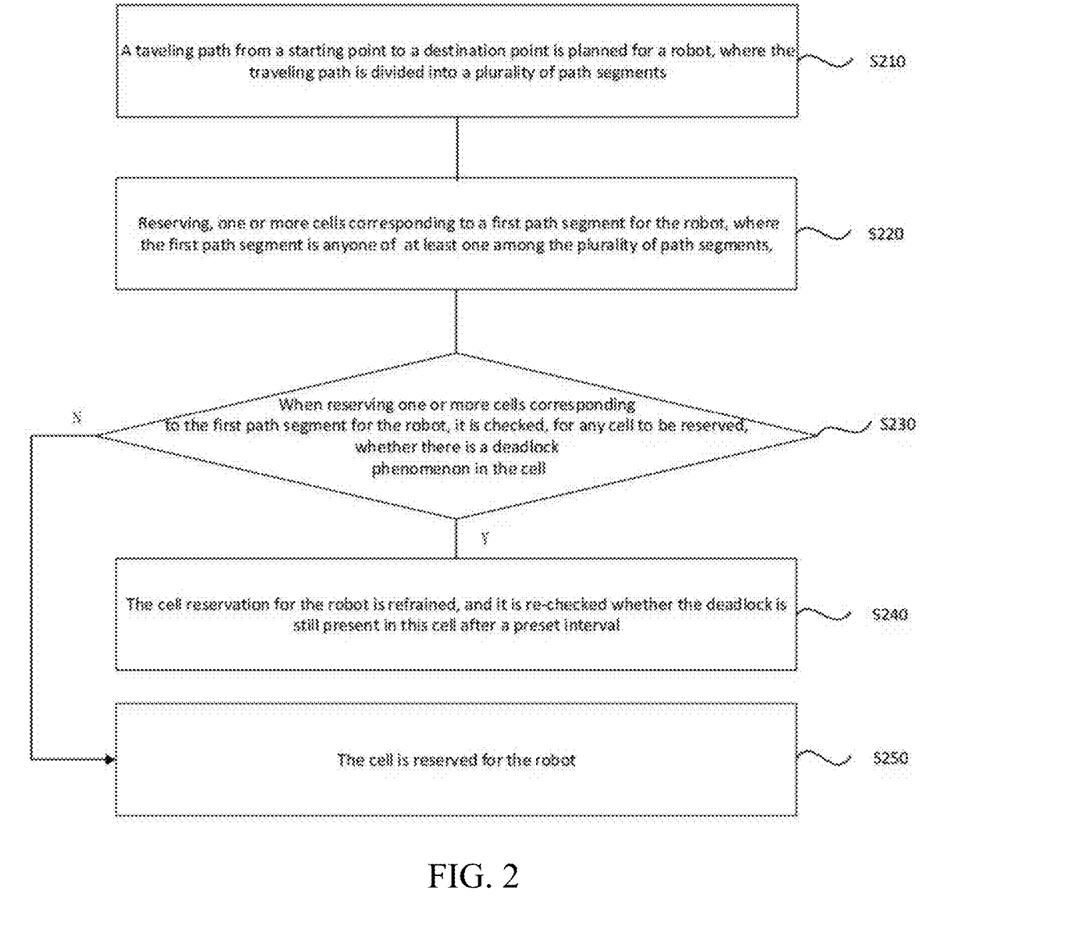
FIG. 2 is a flowchart of a robot routing method provided in embodiment 1 of the present invention.

FIG. 2 is a flowchart of a robot routing method provided in embodiment 1 of the present invention. This embodiment can be applied in the scenario of robot cluster application, in which the robot routing is performed in real time to improve the system efficiency; and it is particularly suitable for the scenario where the operation area of the robots are gridded into multiple cells arranged in rows and columns, deadlock checking is performed during the traveling of the robots and routing is performed according to deadlock checking result to improve the system efficiency. This method can be executed by a robot routing device provided in an embodiment of the present invention. The device can be implemented in software and/or hardware, and can be integrated on any server device with robot routing function. As shown in FIG. 2, the method may specifically include steps S210 to S250.

In S210, a traveling path from a starting point to a destination point is planned for a robot, where the traveling path is divided into a plurality of path segments.

Figure 3:
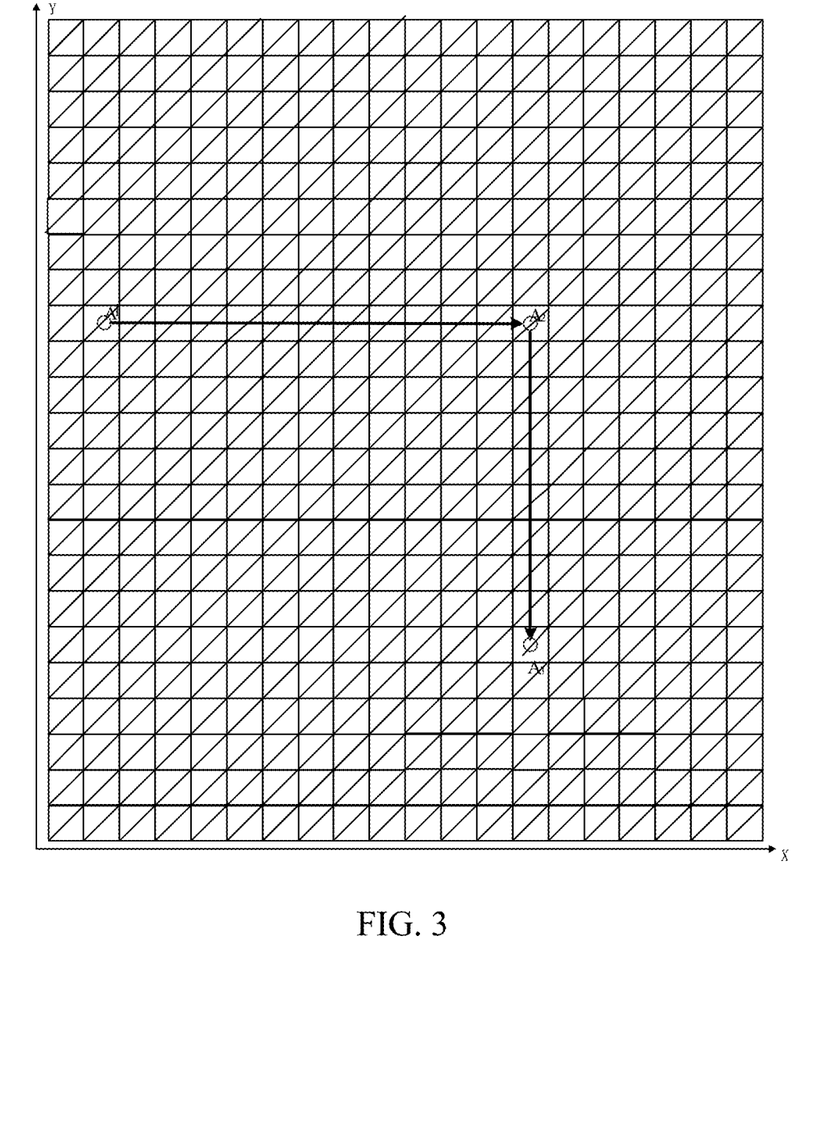
FIG. 3 is a schematic diagram of a grid map provided in the embodiment 1 of the present invention.

As an optional implementation of the embodiment of the present invention, an operation area of the robot (and furthermore a map corresponding to the operation area) is gridded into a plurality of cells arranged in rows and columns. The cell refers to a minimum unit in the gridded operation area, which corresponds to a specific region in the real scene. Since all cells in the gridded operation area correspond to road resources required by the robot in the real scene, and the traveling path of each robot has directionality, the entire gridded operation area in this embodiment can be set in a rectangular coordinate system, as shown in FIG. 3. Each cell in the gridded operation area is the same, and the number of cells is determined by the division granularity. Optionally, the finer the granularity, the larger the number of cells in the gridded operation area, and the smaller the region in the real scene to which each cell is mapped.

In this embodiment, the robot refers to the real robot used in the real scene, which can wirelessly communicate with the server, and is capable of moving in the operation area along the traveling path sent from the server and sending motion status information such as real position and traveling speed to the server through wireless communication in a fixed period. The traveling path is determined by the server according to the starting point and the destination point of the robot and a path planning principle (such as the principle of shortest distance). Optionally, the traveling path may be composed of multiple path segments. It should be noted that the real robot referred to in the following is equivalent to the robot.

Specifically, for each robot, the traveling path can be mapped into the gridded operation area according to the starting point, destination point, and direction of the traveling path, as shown in FIG. 3, and the mapped traveling path in the gridded operation area consists of one or more segments with directions. In other words, one or more path segments in the traveling path are mapped as one or more segments with directions in the gridded operation area.

In S220, reserving, one or more cells corresponding to a first path segment for the robot, where the first path segment is anyone of at least one among the plurality of path segments.

In order to improve the efficiency of the system, in this embodiment, a unique simulation robot can be established for each real robot used in the real scene, and a motion model is established for the simulation robot corresponding to the real robot according to the motion state information reported by the real robot, so that the simulation robot predicts, based on the established motion model, the area to be travelled on the traveling path of the real robot. The simulation robot is a mathematical model in the memory of the server.

In the robot cluster application scenario of this embodiment, after acquiring a system task such as picking task, the server may determine at least two real robots for performing the task according to the working status of respective real robots in the real scene, and can plan the traveling paths for the real robots; at the same time, the server can establish a unique simulation robot for each real robot, and map the traveling path of each real robot into the gridded operation area; then, for each real robot, the server can obtain motion state information such as real position and traveling speed reported by the real robot in a fixed period during its travel along the traveling path, and can establish a motion model for the simulation robot corresponding to the real robot based on the motion state information, so that the simulation robot may predict, based on the established motion model, the area to be travelled on the traveling path of the real robot; i.e., cells corresponding to the path segments are reserved for the real robot based on the prediction of the simulation robot, where one path segment corresponds to one or more cells. The fixed period is set according to the traveling speed of the real robot, and a projected distance in the gridded operation area mapped by a distance travelled by the real robot in one fixed period is within one cell to ensure that each time the real robot passes through one cell, the server can receive the motion status information of the real robot.

Specifically, for each simulation robot, a total cell demand of the simulation robot may be determined according to a projection of the corresponding real robot mapped on the gridded operation area and a traveling path mapped on the gridded operation area. Then, based on the current position, traveling speed, etc. of the simulation robot, one or more among the total cell demand of the simulation robot are used as the demanded cells of the simulation robot, and the demanded cells are determined as the cells corresponding to the path segments reserved for the real robot. Exemplarily, the cells corresponding to the path segments reserved for the real robot may include: the cells corresponding to the path segments reserved for the real robot according to the travel path and the traveling speed; where the number of the cells corresponding to the reserved path segments is proportional to the traveling speed, that is, the faster the traveling speed is, the more cells are reserved.

In addition, in order to avoid collisions between real robots, optionally, one cell can only be occupied by one real robot at a time, that is, the region in the real scene to which each cell corresponds can only be occupied by one real robot at a time.

In S230, in the process of reserving one or more cells corresponding to the first path segments for the robot, it is checked, for any one of the cells to be reserved, whether there is a deadlock phenomenon in the cell. If deadlock exists, S240 is executed; and if deadlock does not exist, S250 is executed.

In this embodiment, the deadlock phenomenon is a path deadlock, and is a phenomenon in which traveling cannot continue at the current moment. Optionally, in case that the cell where the current position of the robot is located forms a loop with other cells where current positions of other robots are located and one of other robots are occupying the cells, it can be determined that the deadlock phenomenon is present in this cell.

Specifically, in this embodiment, a simulation robot corresponding to a real robot can be used to predict in advance whether there is a deadlock phenomenon in each cell to be reserved.

For each simulation robot, after determining its demanded cells, pre-application and allocation process may be performed on the demanded cells successively (one or more cells at a time) with the simulation robot. The pre-application process includes determining whether there is a deadlock in each of the demanded cells in advance, and adding a cell without deadlock as a cell to be applied.

Figure 4:
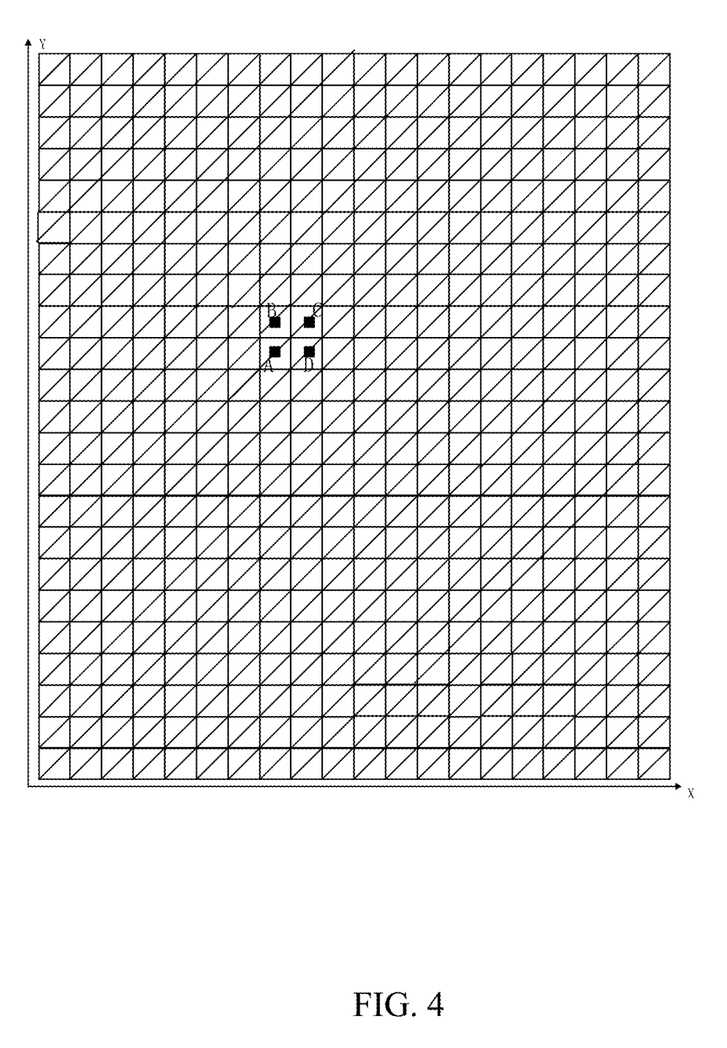
FIG. 4 is a schematic diagram of a cell deadlock phenomenon provided in the embodiment 1 of the present invention.

As shown in FIG. 4, assuming robot A as the current simulation robot, there is a simulation robot B in the system, in front of the path of the simulation robot B there is a simulation robot C, in front of the path of the simulation robot C there is a simulation robot D, and in front of the path of the simulation robot D there is a simulation robot A. It is determined that the simulation robots A, B, C, and D can form a loop B→C→D→A→B based on the cells, and a deadlock is predicted. If the cell to be added for the current simulation robot A is just being occupied by a certain simulation robot, for example, being occupied by the simulation robot B, it is predicted that the deadlock phenomenon is present in the cell to be added for the current simulation robot A, and in turn it is determined that the deadlock phenomenon is present for the cell to be reserved for the real robot corresponding to this simulation robot.

Further, for any cell to be reserved, if the deadlock phenomenon is present in this cell, S240 is executed; and if there is no deadlock, S250 is executed.

In S240, the cell reservation for the robot is refrained, and it is re-checked whether the deadlock is still present in this cell after a preset interval.

Specifically, when the server determines via a simulation robot that the deadlock phenomenon is present in any cell to be reserved for a real robot, it refrains from reserving cells for the real robot, and after a preset interval, the server rechecks via the simulation robot corresponding to the real robot whether the deadlock is still present in this cell. If there is no deadlock, S250 is executed; and if there is deadlock, S240 is repeated. The present interval is a preset maximum waiting duration, which can be dynamically adjusted according to the actual situation.

In order to avoid long time waiting of the real robot, if it is rechecked that the deadlock phenomenon still exists in the cell after the preset interval, the traveling path can be re-planned for the real robot. Exemplary, if it is determined that the robot waits at a position for a duration exceeding a preset period, the traveling path is re-planned for the robot. Furthermore, after re-planning the traveling path for the robot, the process from S220 to S250 may be re-executed.

In S250, the cell is reserved for the robot.

It should be noted that, in this embodiment, a simulation robot is used to predict the road conditions on the traveling path of the real robot, that is, to determine in advance whether the deadlock is present in any cell to be reserved, whereby avoiding the case that the real robot corresponding to the simulation robot enters a deadlock path and causes long time waiting, and improving the efficiency of real robot.

In the technical solution provided by the embodiment of the present invention, in a robot cluster application scenario, a traveling path of a robot is routed at a granularity of cells; in the process of reserving, one or more cells corresponding to anyone of at least one among the plurality of path segments, during the routing process, it is checked whether deadlock phenomenon is present in any cell to be reserved; and if there is no deadlock phenomenon, the cell is reserved for the robot. By checking the deadlock phenomenon, the robot can be prevented from entering the deadlock path and paralyzing in place, resulting in long time waiting, whereby improving the efficiency of the entire system. In addition, occupying the path segments on the traveling path at the granularity of cells can improve the use efficiency of the path segments.

In a real robot clustering application scenario, the traveling paths of two or more real robots may overlap. That is to say, when being mapped into the gridded operation area, two or more simulation robots apply for a same cell. Therefore, when assigning cells to the simulation robots, this situation needs to be fully considered to avoid collisions and the like caused by two or more real robots competing for a real scenario area corresponding to a same cell.

As a optional embodiment of the present invention, before the cell is reserved for the robot, the method may further include: checking whether the cell is also reserved for other robots; if it is also reserved for other robots, determining arrival time costs of the robot and other robots traveling from respective current positions to a location of the cell; and determining whether or not to reserve the cell for the robot based at least in part on the arrival time costs.

Figure 5:
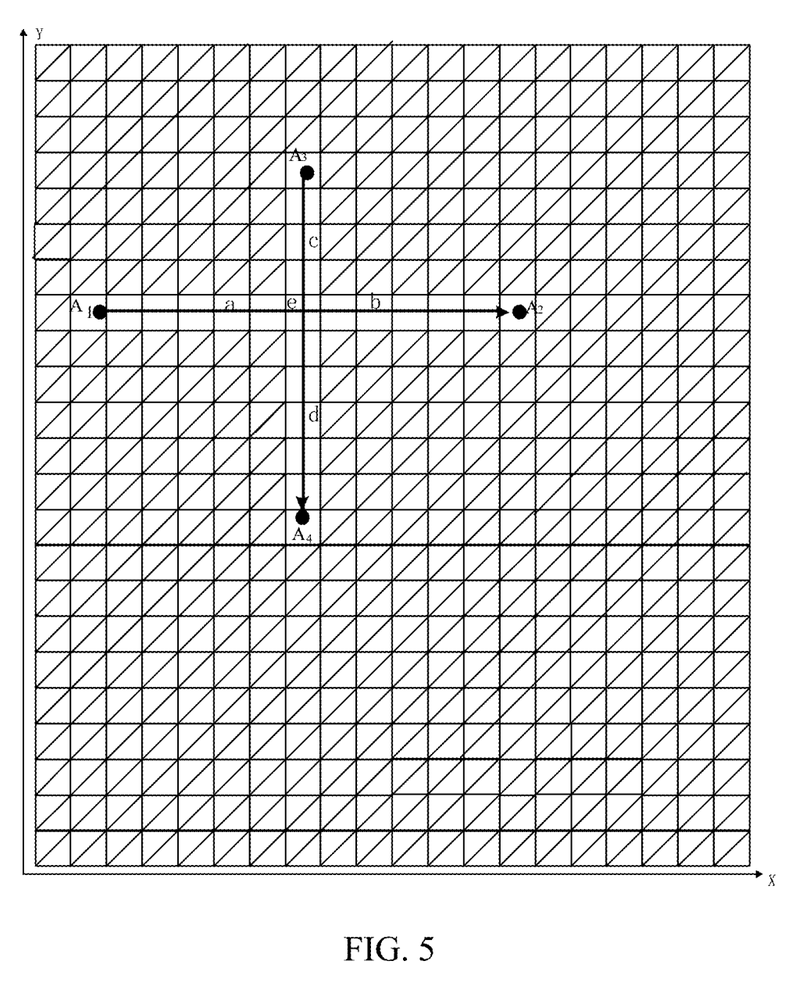
FIG. 5 is a schematic diagram showing an allocation sequence provided in the embodiment 1 of the present invention.

In this embodiment, whether a cell is to be reserved for a real robot may be determined by a simulation robot corresponding to the real robot. Specifically, as shown in FIG. 5, it is assumed that a total demand for map cells of the simulation robot E is all white cells between $A_1$ and $A_2$ along the X-axis direction; the total demand for the map cells of the simulation robot F is all white cells between $A_3$ and $A_4$ along the Y-axis direction. If it is determined according to S230 to S250 that the cells applied by the simulation robot E include cells between cells a and b, and the cell applied by the simulation robot F include cells between cells c to d. When assigning cell e to the simulation robot E, if it is detected that the same cell e is present in the cells assigned for the simulation robot F, then the arrival time cost $T_x$ of the simulation robot E traveling from the current position to the location of the cell e, and the arrival time cost $T_y$ of the simulation robot F traveling from the current position to the location of the cell e are calculated according to according to motion models of the simulation robot E and simulation robot F, respectively. After that, the arrival time cost $T_x$ can be compared with the arrival time cost $T_y$; if $T_x<T_y$, the cell e can be assigned as a target cell to the simulation robot E preferentially, while the simulated robot F is made to wait; and after the real robot corresponding to the simulation robot E moves out of the cell e, the cell e is reassigned to the simulation robot F.

It should be noted that compared with the existing scheduling schemes, the real robot occupies all the path segments on the traveling path when traveling along the traveling path, and lone time waiting exists if the is an overlapped path segment for two real robots. By contrast, in this embodiment, the traveling path of the real robot is routed at the granularity of cells, which can reduce the time for the robots waiting for each other.

Embodiment 2

Figure 6:
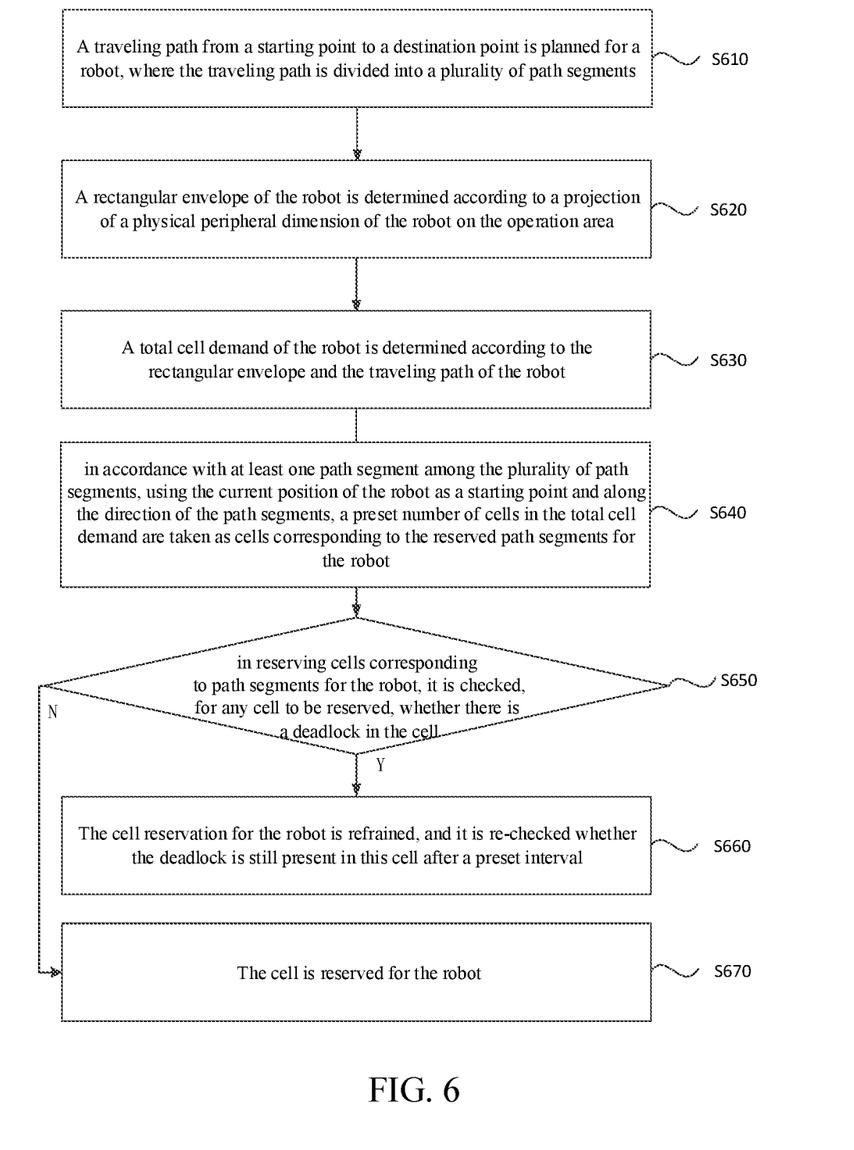
FIG. 6 is a flowchart of a robot routing method provided in embodiment 2 of the present invention.

FIG. 6 is a schematic flowchart of a robot routing method provided in Embodiment 2 of the present invention. Based on the foregoing embodiment, this embodiment specifically provides a way to reserve cells corresponding to path segments for a robot. This embodiment may be combined with various optional solutions in the foregoing one or more embodiments. As shown in FIG. 6, the method may specifically include steps S610 to S670.

In S610, a traveling path from a starting point to a destination point is planned for a robot, where the traveling path is divided into a plurality of path segments.

In S620, a rectangular envelope of the robot is determined according to a projection of a physical peripheral dimension of the robot on the operation area.

In this embodiment, the rectangular envelope is a polygon that can cover the projection of the physical peripheral dimension of the real robot on the operation area (and in turn the gridded operation area), that is, the circumscribed polygon of the projection. Optionally, since each cell in the gridded operation area is equal and rectangular, for convenience of calculation, the circumscribed rectangle of the projection may be considered as the rectangular envelope of the real robot.

In S630, a total cell demand of the robot is determined according to the rectangular envelope and the traveling path of the robot.

In this embodiment, the total cell demand of the simulation robot is all cells demanded for the simulation robot to travel along the direction of the traveling path on the gridded operation area. Optionally, since the motion model of each simulation robot is established based on the motion state information such as the real position and traveling speed reported by its corresponding real robot, that is, the position and speed of the simulation robot in the memory are the position and speed reported by the real robot, the total cell demand of the real robot is the total cell demand of its corresponding simulation robot.

In this embodiment, for each real robot, the traveling path of the real robot may be mapped into the gridded operation area according to the starting point, destination point, and other critical points such as turning point of the traveling path of the traveling path; then, the total cell demand of the simulation robot is determined according to the projection of the real robot in the gridded operation area and the traveling path mapped in the gridded operation area.

It can be understood that the traveling path mapped in the gridded operation area is composed of one or more segments with directions. Specifically, the width and length of the total cell demand along the direction of the traveling path can be determined according to the rectangular envelope and the traveling path mapped in the gridded operation area, and the total cell demand of the real robot can be determined based on the length and width. The direction of movement along the traveling path is the length direction, and the direction perpendicular to the traveling direction is the width direction. Optionally, the determined width along the direction of the traveling path is determined by the width of the rectangular envelope. If the width of the rectangular envelope is less than the width of one cell, the width of one cell can be taken as the width along the direction of the traveling path. If the width of the rectangular envelope is greater than the width of one cell and less than the width of two cells, then the width of the two cells can be used as the width along the direction of the traveling path; and a product of the number of rectangular envelops required for covering the distance from the start point to the destination point of the traveling path with the length of the rectangular envelop is taken as the determined length along the direction of the traveling path.

Figure 7:
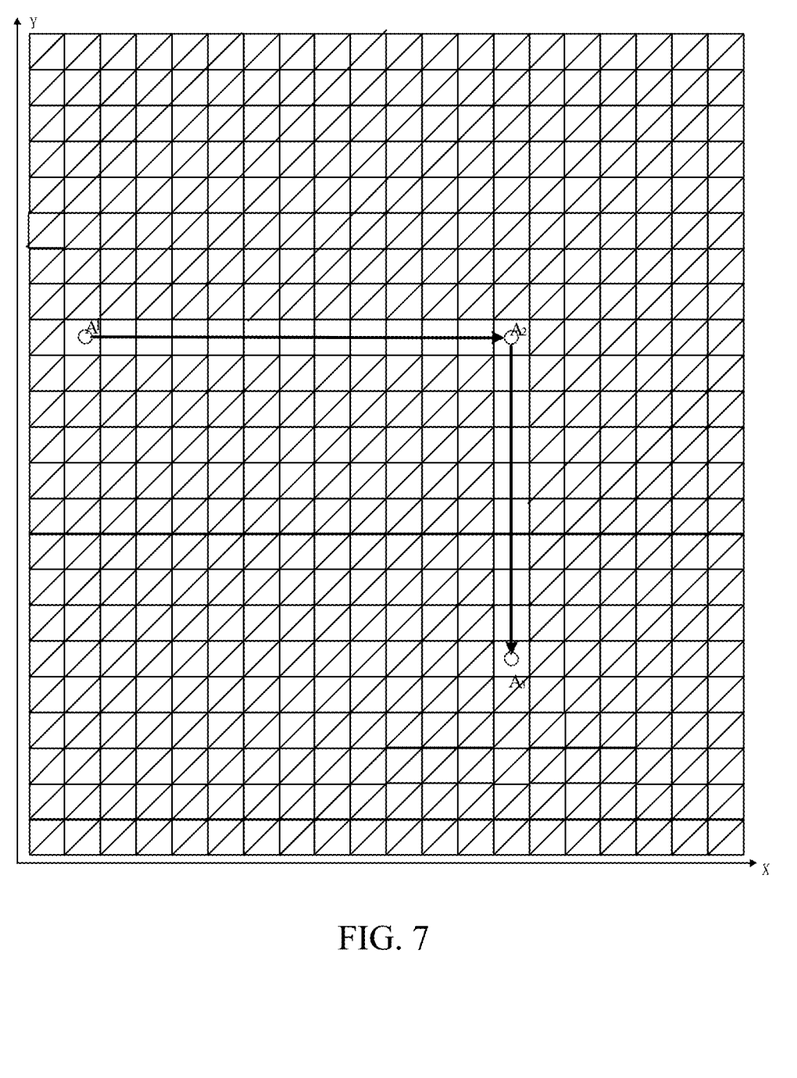
FIG. 7 is a schematic diagram of total cell demand for a robot in the embodiment 2 of the present invention.

Exemplarily, the rectangular envelope of a real robot may be greater than, less than or equal to one cell in the gridded operation area. Optionally, in order to reduce the amount of calculation, when gridding the operation area, the rectangular envelope of the real robot is taken as the minimum division granularity, the map corresponding to the real robot's operating area is uniformly arrayed, and then the rectangular envelope of the real robot is one cell in the resulted gridded operation area. For example, as shown in FIG. 7, the traveling path of a certain real robot mapped in the gridded operation area is comprised by two directional segments, in which the first one is from start point $A_1$ $(X_1, Y_1)$ to the turning point $A_2$ $(X_2, Y_2)$, and the second one is from the turning point $A_2$ $(X_2, Y_2)$ to the end point $A_3$ $(X_3, Y_3)$. Because the rectangular envelope of the real robot is one cell in the gridded operation area, all the white cells in FIG. 7 compose the total cell demand of the real cell, i.e. the total cell demand of the simulation corresponding to the real robot.

In S640, in accordance with at least one path segment among the plurality of path segments, using the current position of the robot as a starting point and along the direction of the path segments, a preset number of cells in the total cell demand are taken as cells corresponding to the reserved path segments for the robot.

In this embodiment, in order to ensure the traveling safety of a real robot in an emergency, the preset number of cells in this embodiment may be determined in the following manner: the cells covered when the traveling speed of the robot is accelerated from an initial value to a set highest value, and the cells covered when the traveling speed of the robot is reduced from the current value to the initial value, are taken as the preset number of cells. The initial value of the traveling speed can be 0, the set highest value is the maximum speed that the real robot can reach during the traveling process, and the current value is the speed of the real robot at the current moment.

Specifically, after determining the total cell demand of each simulation robot, for each simulation robot, using the current position of the simulation robot as starting point and along the direction of the traveling path (that is, along the direction of the total cell demand of the simulation robot), a preset number of cells are taken as the demanded cells of the simulation robot, and the demanded cells of the simulation robot are determined as the cells corresponding to the reserved path segments of the real robot. Optionally, for each simulation robot, as its current position changes, its demanded cells change dynamically, that is, the cells corresponding to the path segments reserved for the real robot also change dynamically; in addition, the traveling speed and the number of the demanded cells is positively related, that is, the faster the traveling speed is, the more the number of demanded cells is, and the more the number of reserved cells is.

In S650, in the process of reserving cells corresponding to the path segments for the robot, it is checked, for any one of the cells to be reserved, whether there is a deadlock phenomenon in the cell. If deadlock exists, S660 is executed; if deadlock does not exist, S670 is executed.

In S660, the cell reservation for the robot is refrained, and it is re-checked whether the deadlock is still present in this cell after a preset interval.

In S670, the cell is reserved for the robot.

In this embodiment, the state information of the cells in the gridded operation area dynamically changes with the assignment of the simulation robots and the occupation of the real robots. The state information of the cells may include, but not limited to, idle status, assigned status, and occupied status. Optionally, the state information of the cells assigned to the simulation robot (that is, reserved for the real robot) is the assigned status; when the real robot moves to the real scene region corresponding to the cell to which the corresponding simulation robot has been assigned, the real robot actually occupies the cell; and when the real robot moves out of the cell (that is, the real scene region corresponding to the cell), the state information of the cell can be set to the idle status or a released status so that other simulation robots can apply for the cell. Exemplarily, after the cell is reserved for the robot, the method further includes: changing the state information of the reserved cells to the assigned status; and during the process of controlling the robot traveling in the reserved cells, changing the state information of overlapping cells where the rectangular envelope of the robot overlaps with the reserved cells into the occupied status; after the rectangular envelope of the robot moves out of the overlapping cells, changing the state information of the overlapping cells into the idle status. Specifically, for each real robot, based on the real position reported by the real robot and the rectangular envelope of the real robot, it may be determined whether the rectangular envelope overlaps with cells assigned to the simulation robot corresponding to the real robot; if there is overlap, the state information of overlapping cells is changed into occupied status; then, after the rectangular envelope of the real robot moves out of the overlapped cells, the state information of the overlapping cells is changed to the idle status so that other simulation robots can apply for the these cells. When the state information of the overlapping cells is changed to the idle status, the overlapping cells can also be deleted from the total cell demand and the demanded cells of the simulation robot corresponding to the real robot.

In the technical solution provided by the embodiment of the present invention, the cells in the gridded operation area represent road resources in the real scene. In the robot cluster application scenario, a traveling path of a robot is routed at a granularity of cells; in the process of reserving, one or more cells corresponding to anyone of at least one among the plurality of path segments, during the routing process, during the routing process, it is checked whether deadlock phenomenon is present in any cell to be reserved;

and if there is no deadlock phenomenon, the cell is reserved for the robot. By checking the deadlock phenomenon, the robot can be prevented from entering the deadlock path and paralyzing in place, resulting in long time waiting, whereby improving the efficiency of the entire system. In addition, occupying the path segments on the traveling path at the granularity of cells can improve the use efficiency of the path segments.

Embodiment 3

Figure 8:
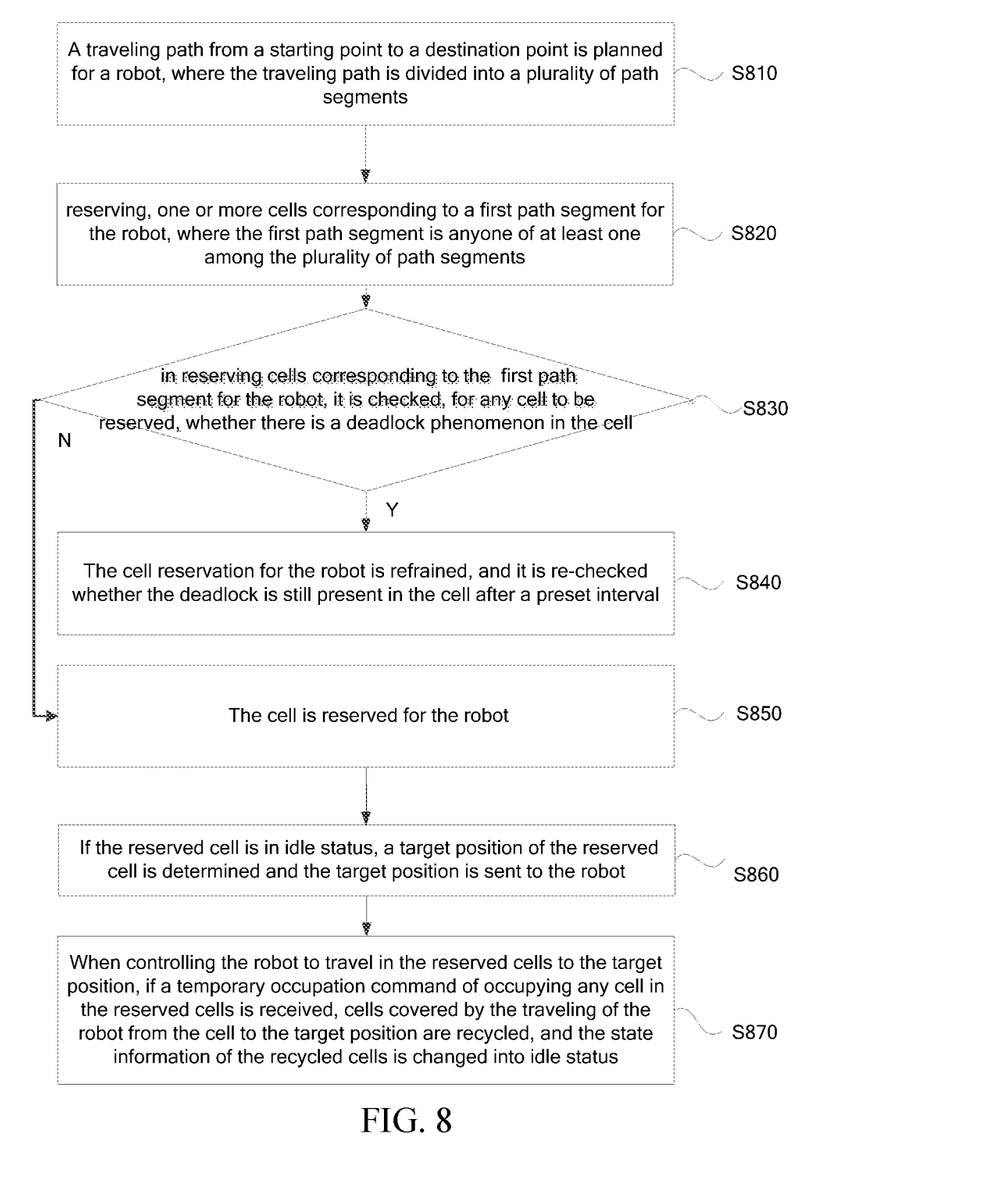
FIG. 8 is a flowchart of a robot routing method provided in embodiment 3 of the present invention.

FIG. 8 is a schematic flowchart of a robot routing method provided in embodiment 3 of the present invention. Based on the foregoing embodiment, in this embodiment an optimization step may be added after the step of reserving the cell for the robot. This embodiment may be combined with various optional solutions in the foregoing one or more embodiments. As shown in FIG. 8, the method may specifically include steps S810 to S870.

In S810, a traveling path from a starting point to a destination point is planned for a robot, where the traveling path is divided into a plurality of path segments.

In S820, reserving, one or more cells corresponding to a first path segment for the robot, where the first path segment is anyone of at least one among the plurality of path segments.

In S830, in the process of reserving cells corresponding to the first path segments for the robot, it is checked, for any one of the cells to be reserved, whether there is a deadlock phenomenon in the cell. If deadlock exists, S840 is executed; and if deadlock does not exist, S850 is executed.

In S840, the cell reservation for the robot is refrained, and it is re-checked whether the deadlock is still present in the cell after a preset interval.

In S850, the cell is reserved for the robot.

In S860, if the reserved cell is in idle status, a target position of the reserved cell is determined and the target position is sent to the robot.

Specifically, after the cell is reserved for the real robot, if it is determined that the reserved cell is in an idle status, the target position of the reserved cell may be sent to the real robot, so that the real robot moves within a scope of a real scene corresponding to the current position and the target position. If it is determined that the reserved cell is in an occupied status or the like, the target position of the reserved cell is not sent to the real robot until the reserved cell is in the idle status, so that the real robot moves within a scope of a real scene corresponding to the current position and the target position. If there is only one reserved cell, the target position is the position of the real scene to which the reserved cell corresponds; if there are multiple cells reserved, the target position may be the location of the real scene to which the last one along the traveling path among the reserved cells corresponds.

In S870, in the process of controlling the robot to travel in the reserved cells to the target position, if a temporary occupation command of occupying any cell in the reserved cells is received, cells covered by the traveling of the robot from the cell to the target position are recycled, and the state information of the recycled cells is changed into idle status.

To ensure safe traveling, each real robot can be equipped with obstacle detection equipment. Optionally, for each real robot, when the real robot travels in the reserved cells from the current position to the target position, if an obstacle in the real scene area corresponding to a certain cell is detected, such as other real robots in this real scene, the real robot may stop in the real scene region corresponding to a cell previous to this cell and wait according to a preset obstacle avoidance mechanism until the obstacle moves out of this cell, and then continue to travel.

In the case that the obstacle is any other real robot in the scene, while the real robot is waiting, if the server receives the temporary occupation command with regard to the cell, cells covered by the traveling of the real robot from the cell to the target position are recycled, and the state information of the recycled cells is changed into idle status, to facilitate other simulation robots to apply for. At the same time, the traveling path for the real robot may be re-planned, where, the temporary occupation command may be triggered by the activation of any other real robot at the position of this cell.

In addition, if the obstacle is an idle real robot, the method may further include: if it is detected that the idle robot is occupying a cell reserved for the robot, sending a movement command to the idle robot to move the idle robot out of the cell reserved for the robot. Specifically, for each simulation robot, if it is detected that a position in the gridded operation area, to which the position of the idle real robot is mapped, is at a position of a cell assigned to the simulation robot (and in turn position of any cell in the cells), a movement command is sent to the idle real robot, so that the idle real robot moves out of the cells reserved for the real robot according to the movement command. The movement command includes a position-to-go. The position-to-go is determined according to the distribution density of real robots in the system, and the distribution density of real robots is determined by the number of real robots in the system and the area of the region. Furthermore, the position-to-go is a preset position where the distribution density of real robots is low in the scene.

In the technical solution provided by the embodiment of the present invention, in the process of controlling the robot to travel in the reserved cells from the current position to the target position, the robot's traveling path can be flexibly adjusted in accordance with the unforeseen circumstances in the real scene, increasing the flexibility and usage scenarios of the solution.

Embodiment 4

Figure 9:
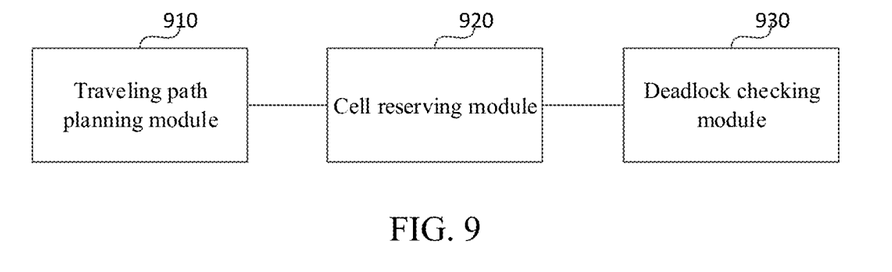
FIG. 9 is a schematic structural diagram of a robot routing device provided in embodiment 4 of the present invention.

FIG. 9 is a structural diagram of a robot routing device provided in embodiment 4 of the present invention. The technical solutions of the present embodiment may be applied in the robot clustering application scenario, in which the robot routing is performed in real time to improve the system efficiency; and it is particularly suitable for the scenario where the operation area of the robots are gridded into multiple cells arranged in rows and columns, deadlock checking is performed during the traveling of the robots and routing is performed according to deadlock checking result to improve the system efficiency. The device can be implemented in software and/or hardware, and can be integrated on any server device with robot routing function. As shown in FIG. 9, the robot routing device according to the embodiment of the present invention may include:

a traveling path planning module 910 adapted to plan, for a robot, a traveling path from a starting point to a destination point, where the traveling path is divided into a plurality of path segments;

a cell reserving module 920 adapted to reserve, reserving, one or more cells corresponding to a first path segment for the robot, where, the first path segment is anyone of at least one among the plurality of path segments;

a deadlock checking module 930 adapted to check, in the process of reserving cells corresponding to the first path segments for the robot, for any one of the cells to be reserved, whether there is a deadlock phenomenon in the cell;

the deadlock checking module 930 further adapted to refrain from cell reservation for the robot in case that the deadlock is present, and re-checking whether the deadlock is still present in this cell after a preset interval;

the cell reserving module 920 further adapted to reserve the cell for the robot in a case that there is no deadlock phenomenon.

In the technical solution provided by the embodiment of the present invention, in a robot cluster application scenario, a traveling path of a robot is routed at a granularity of cells; in the process of reserving, one or more cells corresponding to anyone of at least one among the plurality of path segments, during the routing process, it is checked whether deadlock phenomenon is present in any cell to be reserved; and if there is no deadlock phenomenon, the cell is reserved for the robot. By checking the deadlock phenomenon, the robot can be prevented from entering the deadlock path and paralyzing in place, resulting in long time waiting, whereby improving the efficiency of the entire system. In addition, occupying the path segments on the traveling path at the granularity of cells can improve the use efficiency of the path segments.

Exemplarily, the deadlock checking module 930 is specifically adapted to:

in case that the cell where the current position of the robot is located forms a loop with other cells where current positions of other robots are located and one of other robots are occupying the cells, determining that the deadlock phenomenon is present in this cell.

Exemplarily, the traveling path planning module 910 is further adapted to:

if it is determined that the robot waits at a position for a duration exceeding a preset period, re-planning the traveling path for the robot.

Exemplarily, the cell reserving module 920 is specifically adapted to:

reserving the cells corresponding to the first path segment for the robot according to the traveling speed; where the traveling speed is proportional to the number of reserved cells corresponding to the path segments.

Exemplarily, the foregoing device may further include:

a rectangular envelope determination module adapted to determine a rectangular envelope of the robot according to a projection of a physical peripheral dimension of the robot on the operation area;

a total demand determination module adapted to determine a total cell demand of the robot according to the rectangular envelope and the traveling path of the robot.

Exemplarily, the cell reserving module 920 is further specifically adapted to:

in case that a preset number of cells is more than one, taking the preset number of cells in the total cell demand, starting from a current position of the robot and along a direction of the first path segment, as the cells to be reserved for the robot, which correspond to the first path segment.

Exemplarily, the preset number of cells includes cells covered when the traveling speed of the robot is accelerated from an initial value to a set highest value, and the cells covered when the traveling speed of the robot is reduced from the current value to the initial value.

Exemplarily, the device may further include:

a reservation checking module adapted to check whether the cell is also reserved for other robots;

an arrival time cost determination module adapted to, if the cell is also reserved for other robots, determine arrival time costs of the robot and other robots traveling from respective current positions to a location of the cell; and the cell reserving module 920 further adapted to determine whether or not to reserve the cell for the robot based at least in part on the arrival time costs.

Exemplarily, the device may further include:

a position synchronization module adapted to determine a target position of the reserved cell if the reserved cell is in idle status, and send the target position to the robot.

Exemplarily, the device may further include:

a movement command sending module adapted to send a movement command to an idle robot if it is detected that the idle robot is occupying a cell reserved for the robot, so that the idle robot moves out of the cell reserved for the robot.

Exemplarily, the movement command includes a position-to-go, and the position-to-go is determined according to a density of robots in the system, and the density of robots is determined according to the number of active robots and an area of the region in the system.

Exemplarily, the device may further include:

a recycling module adapted to, after the target position is sent to the robot and in the process of controlling the robot to travel in the reserved cells to the target position, if a temporary occupation command of occupying any cell in the reserved cells is received, recycling cells covered by the traveling of the robot from the cell to the target position, and changing the state information of the recycled cells into idle status.

Exemplarily, the device may further include:

a state changing module adapted to change state information of the reserved cells into an assigned status after the cells are reserved for the robot.

The state change module is further adapted to, during the process of controlling the robot traveling in the reserved cells, changing the state information of overlapping cells where the rectangular envelope of the robot overlaps with the reserved cells into an occupied status.

The state change module is further adapted to, after the rectangular envelope of the robot moves out of the overlapping cells, changing the state information of the overlapping cells into an idle status.

Embodiment 5

Figure 10:
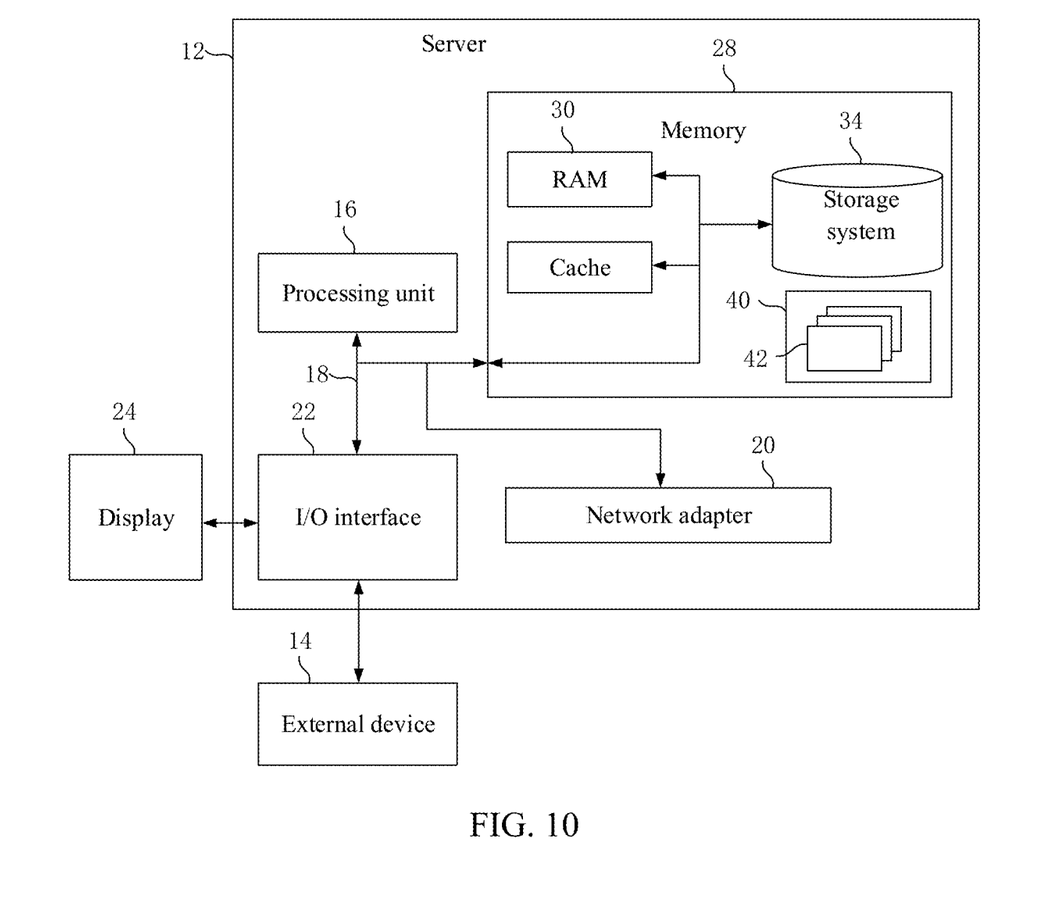
FIG. 10 is a schematic structural diagram of a server provided in embodiment 5 of the present invention.

FIG. 10 is a schematic structural diagram of a server provided in Embodiment 5 of the present invention. FIG. 10 shows a block diagram of an exemplary server 12 applicable in implementing embodiments of the present invention. The server 12 shown in FIG. 10 is merely an example, and should not impose any limitation on the function and scope of use of the embodiments of the present invention.

As shown in FIG. 10, the server 12 is represented in the form of a general-purpose computing device. The components of the server 12 may include, but not limited to, one or more processors or processing units 16, a memory 28, and a bus 18 that connects different system components (including the memory 28 and the processing unit(s) 16).

Bus 18 represents one or more of several types of bus structures, including memory a bus or memory controller, a peripheral bus, an accelerated graphics port, a local bus in a processor or in any bus architecture using a variety of bus structures. By way of example, these architectures include, but not limited to, the Industry Standard Architecture (ISA) bus, the Micro Channel Architecture (MAC) bus, the enhanced ISA bus, the Video Electronics Standards Association (VESA) local bus, and peripheral component interconnects (PCI) bus.

The server 12 typically includes a variety of computer system readable media. These media can be any available media that can be accessed by the server 12, including volatile and non-volatile media, and removable and non-removable media.

The memory 28 may include computer system readable media in the form of volatile memory, such as random access memory (RAM) 30 and/or cache 32. The server 12 may further include other removable/non-removable, volatile/nonvolatile computer system storage media. For example only, the storage system 34 may be used to read and write non-removable, non-volatile magnetic media (not shown in FIG. 10, commonly referred to as a "hard drive"). Although not shown in FIG. 10, a disk drive for reading from and writing to a removable non-volatile disk (such as a "floppy disk") and an optical drive for reading from and writing to a removable non-volatile optical discs (such as CD-ROM, DVD-ROM or other optical media) may be provided. In these cases, each drive may be connected to the bus 18 through one or more data medium interfaces. The memory 28 may include at least one program product having a set of program modules (e.g., at least one module) configured to perform the functions of the embodiments of the present invention.

A program/utility tool 40 having a set (at least one) of program modules 42 may be stored, for example, in the memory 28. Such program modules 42 include, but not limited to, an operating system, one or more application programs, other program modules, and program data. Each one of these examples, or some combination thereof, may include an implementation of a network environment. The program modules 42 generally perform functions and/or methods in the embodiments described in the present invention.

The server 12 may further communicate with one or more external devices 14 (such as a keyboard, pointing device, display 24, etc.), and may further communicate with one or more devices that enable a user to interact with the server 12, and/or communicate with any device (for example, a network card, a modem, etc.) that enables the server 12 to communicate with one or more other computing devices. This communication can be performed through an input/output (I/O) interface 22. Moreover, the server 12 may further communicate with one or more networks (for example, a local area network (LAN), a wide area network (WAN), and/or a public network such as the Internet) through a network adapter 20. As shown, the network adapter 20 communicates with other modules of the server 12 through the bus 18. It should be understood that although not shown in FIG. 10, other hardware and/or software modules may be used in conjunction with the server 12, including but not limited to: microcode, device drivers, redundant processing units, external disk drive arrays, RAID systems, tape drives and data backup storage systems.

The processing unit 16 executes various functional applications and data processing by running a program stored in the memory 28, for example, implementing a robot routing method provided in embodiments of the present invention.

Embodiment 6

The embodiment 6 of the present invention further provides a computer-readable storage medium on which a computer program is stored. When the program is executed by a processor, the robot routing method according to any of the foregoing embodiments can be implemented.

The computer storage medium in the embodiment of the present invention may be any combination of one or more computer-readable media. The computer-readable medium may be a computer-readable signal medium or a computer-readable storage medium. The computer-readable storage medium may be, for example, but not limited to, system, apparatus, or device of electronic, magnetic, optical, electromagnetic, infrared, or semiconductor, or any combination thereof. More specific examples (non-exhaustive list) of computer-readable storage media include: electrical connections with one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing. In this document, a computer-readable storage medium may be any tangible medium that contains or stores a program that can be used by or in combination with an instruction execution system, apparatus, or device.

The computer-readable signal medium may include a data signal propagated in baseband or as part of a carrier, which carries computer-readable program codes. Such a propagated data signal may take many forms, including but not limited to electromagnetic signals, optical signals, or any suitable combination of the foregoing. The computer-readable signal medium may also be any computer-readable medium other than a computer-readable storage medium, and the computer-readable medium can send, propagate, or transmit a program for use by or in connection with an instruction execution system, apparatus, or device.

Program codes contained on a computer-readable medium may be transmitted using any appropriate medium, including but not limited to: wireless, wire, optical fiber cable, RF, etc., or any suitable combination of the foregoing.

Computer program codes for performing the operations of the present invention may be written in one or more programming languages, or combinations thereof, including object-oriented programming languages such as Java, Smalltalk, C++, and conventional procedural programming languages such as "C" language or similar programming languages. The program codes can be executed entirely or partially on users' computer, as an independent software package, in a way of partially on the users' computer and partially on a remote computer, or entirely on a remote computer or server. In the case of a remote computer, the remote computer can be connected to the users' computer through any kind of network, including local area network (LAN) or wide area network (WAN), or can be connected to an external computer (such as through the Internet connection by using an Internet service provider).

The sequence numbers of the foregoing embodiments are merely for description, and do not represent the superiority or inferiority of the embodiments.

Those of ordinary skill in the art should understand that the modules or operations of the embodiments of the present invention described above may be implemented by a general-purpose computing device, which may be centralized on a single computing device or distributed on a network composed of multiple computing devices. Alternatively, they can be implemented with program codes executable by a computer device, so that they can be stored in a storage device and executed by a computing device. Or they can be made into individual integrated circuit modules, or several modules or operations among them may be made into a single integrated circuit module for implementation. As such, the invention is not limited to any particular combination of hardware and software.

Embodiments in this specification are described in a progressive manner. Each embodiment focuses on the differences from other embodiments, and the same or similar parts between the various embodiments may refer to each other.

The above are only preferred embodiments of the present invention and are not intended to limit the present invention. For those skilled in the art, the present invention may have various modifications and changes. Any modification, equivalent, and improvement made within the spirit and principle of the present invention shall fall in the scope of the present invention.

What is claimed is:

1. A method for routing a robot, wherein an operation area of the robot is gridded into a plurality of cells arranged in rows and columns, and the method comprises:
   planning, for the robot, a traveling path from a starting point to a destination point, wherein the traveling path is divided into a plurality of path segments; and
   reserving, one or more cells corresponding to a first path segment for the robot,
   wherein, the first path segment is any one of at least one among the plurality of path segments,
   in a process of reserving one or more cells corresponding to the first path segment for the robot, for any cell to be reserved, checking whether there is a deadlock phenomenon in the cell to be reserved;
   in case that there is the deadlock phenomenon, refraining from reserving the cell for the robot, and re-checking whether the deadlock phenomenon is still present in the cell after a preset interval; and
   in case that there is no deadlock phenomenon, reserving the cell for the robot and controlling the robot to travel in the reserved cell;
   wherein for any cell to be reserved, checking whether there is the deadlock phenomenon in the cell to be reserved comprises:
   in case that a cell where a current position of the robot is located forms a loop with a cell where a current position of one or more other robots is located, directions of movement of robots that form the loop are all in a clockwise direction or are all in a counterclockwise direction, and one of the one or more other robots is occupying the cell to be reserved, determining that the deadlock phenomenon is present in the cell to be reserved.

2. The method according to claim 1, further comprising:
   in case of determining that the robot waits at a position for a duration exceeding a preset period, re-planning the traveling path for the robot.

3. The method according to claim 1, wherein reserving one or more cells corresponding to a first path segment for the robot comprising:
   reserving one or more cells corresponding to the first path segment for the robot according to a traveling speed; wherein the traveling speed is proportional to the number of reserved one or more cells corresponding to the first path segment.

4. The method according to claim 1, wherein before reserving, reserving, one or more cells corresponding to a first path segment for the robot, the method further comprises:
   determining a rectangular envelope of the robot according to a projection of a physical peripheral dimension of the robot on the operation area; and
   determining a total cell demand of the robot according to the rectangular envelope and the traveling path of the robot.

5. The method according to claim 4, wherein in case that a preset number of cells is more than one, reserving, one or more cells corresponding to a first path segment for the robot comprises:
   taking the preset number of cells in the total cell demand, starting from a current position of the robot and along a direction of the first path segment, as the cells to be reserved for the robot, which correspond to the first path segment.

6. The method according to claim 5, wherein the preset number of cells comprises cells covered when the traveling speed of the robot is accelerated from an initial value to a set highest value, and cells covered when the traveling speed of the robot is reduced from a current value to the initial value.

7. The method according to claim 1, wherein before reserving the one or more cells for the robot, the method further comprises:
   checking whether the cell is also reserved for another robot;
   if the cell is also reserved for another robot, determining arrival time costs of the robot and the another robot traveling from respective current positions to a location of the cell; and
   determining whether or not to reserve the cell for the robot based at least in part on the arrival time costs.

8. The method according to claim 1, further comprising:
   determining a target position of the reserved cell if the reserved cell is in an idle status, and sending the target position to the robot.

9. The method according to claim 1, further comprising:
   sending a movement command to an idle robot if it is detected that the idle robot is occupying a cell reserved for the robot, so that the idle robot moves out of the cell reserved for the robot.

10. The method according to claim 9, wherein the movement command includes a position-to-go, and the position-to-go is determined according to a density of robots in a system, and the density of robots is determined according to a number of active robots in the system and an area of the operation area.

11. The method according to claim 8, wherein after sending the target position to the robot, the method further comprises:
    in a process of controlling the robot to travel in reserved cells to the target position, if a temporary occupation command of occupying any cell in the reserved cells is received, recycling cells covered by traveling of the robot from the cell to the target position, and changing state information of the recycled cells into the idle status.

12. The method according to claim 4, wherein after reserving, one or more cells corresponding to a first path segment for the robot, the method further comprises:
    changing state information of the reserved one or more cells into an assigned status;
    during a process of controlling the robot traveling in the reserved one or more cells, changing state information of overlapping one or more cells where a rectangular envelope of the robot overlaps with the reserved one or more cells into an occupied status; and for any overlapping cell, after the rectangular envelope of the robot moves out of the overlapping cell, changing the state information of the overlapping cell into an idle status.

13. A server comprising:
one or more processing devices; and
a storing device for storing one or more programs;
when being executed by the one or more processing devices, the one or more programs enabling the one or more processing devices to performing following operations:
gridding an operation area of a robot into a plurality of cells arranged in rows and columns;
planning, for the robot, a traveling path from a starting point to a destination point, wherein the traveling path is divided into a plurality of path segments; and
reserving, one or more cells corresponding to a first path segment for the robot,
wherein, the first path segment is any one of at least one among the plurality of path segments,
in a process of reserving one or more cells corresponding to the first path segment for the robot, for any cell to be reserved, checking whether there is a deadlock phenomenon in the cell to be reserved;
in case that there is the deadlock phenomenon, refraining from reserving the cell for the robot, and re-checking whether the deadlock phenomenon is still present in the cell after a preset interval; and
in case that there is no deadlock phenomenon, reserving the cell for the robot and controlling the robot to travel in the reserved cell
wherein the one or more processing devices further perform:
in case that a cell where a current position of the robot is located forms a loop with a cell where a current position of one or more other robots is located, directions of movement of robots that form the loop are all in a clockwise direction or are all in a counterclockwise direction, and one of the one or more other robots is occupying the cell to be reserved, determining that the deadlock phenomenon is present in the cell to be reserved.

14. The server according to claim 13, wherein the one or more processing devices further perform:
in case of determining that the robot waits at a position for a duration exceeding a preset period, re-planning the traveling path for the robot.

15. The server according to claim 13, wherein the one or more processing devices further perform:
reserving one or more cells corresponding to the first path segment for the robot according to a traveling speed; wherein the traveling speed is proportional to the number of reserved one or more cells corresponding to the first path segment.

16. A computer-readable storage medium having a computer program stored thereon, when being executed by a processor, the program implementing following operations:
gridding an operation area of a robot into a plurality of cells arranged in rows and columns;
planning, for the robot, a traveling path from a starting point to a destination point, wherein the traveling path is divided into a plurality of path segments; and
reserving, one or more cells corresponding to a first path segment for the robot,
wherein, the first path segment is anyone of at least one among the plurality of path segments,
in a process of reserving one or more cells corresponding to the first path segment for the robot, for any cell to be reserved, checking whether there is a deadlock phenomenon in the cell to be reserved;
in case that there is the deadlock phenomenon, refraining from reserving the cell for the robot, and re-checking whether the deadlock phenomenon is still present in the cell after a preset interval; and
in case that there is no deadlock phenomenon, reserving the cell for the robot and controlling the robot to travel in the reserved cell
wherein when being executed by the processor, the program further implements the following operations:
in case that a cell where a current position of the robot is located forms a loop with a cell where a current position of one or more other robots is located, directions of movement of robots that form the loop are all in a clockwise direction or are all in a counterclockwise direction, and one of the one or more other robots is occupying the cell to be reserved, determining that the deadlock phenomenon is present in the cell to be reserved.

17. The storage medium according to claim 16, wherein when being executed by the processor, the program further implements following operations:
in case of determining that the robot waits at a position for a duration exceeding a preset period, re-planning the traveling path for the robot.

* * * * *